US008837748B2

(12) United States Patent
Chacko et al.

(10) Patent No.: US 8,837,748 B2
(45) Date of Patent: Sep. 16, 2014

(54) METHOD AND APPARATUS FOR RECEIVING AND PLAYING A SIGNAL IN A RADIO RECEIVER

(75) Inventors: V. C. Prakash VK Chacko, Penang (MY); Thean Hai Ooi, Batu Maung (MY); Kar Boon Oung, Penang (MY); Cheah Heng Tan, Bayan Lepas (MY); Huoy Thyng Yow, Perak (MY)

(73) Assignee: Motorola Solutions, Inc., Schaumburg, IL (US)

( * ) Notice: Subject to any disclaimer, the term of this patent is extended or adjusted under 35 U.S.C. 154(b) by 436 days.

(21) Appl. No.: 13/306,136

(22) Filed: Nov. 29, 2011

(65) Prior Publication Data

US 2013/0136276 A1 May 30, 2013

(51) Int. Cl.
*H04B 15/00* (2006.01)

(52) U.S. Cl.
USPC ................. 381/93; 381/95; 381/96; 704/207; 455/151.2

(58) Field of Classification Search
USPC ................. 381/83, 93, 56, 59, 61, 66, 95, 96, 381/111–117, 318; 704/205, 207, 270; 455/151.2
See application file for complete search history.

(56) References Cited

U.S. PATENT DOCUMENTS

2007/0078647 A1 4/2007 Pavlov et al.

OTHER PUBLICATIONS

Sean Costello, "Early pitch shifting: The Eventide H910 Harmonizer", Valhallablog,—"Feedback, anti-feedback, and complexity in time-varying systems"—http://valhalladsp.wordpress.com/2010/05/07/early-pitch-shifting-the-eventide-h910-harmonizer"—Including: M.R. Schroeder—"Improvement of Feedback Stability of Public Address Systems by Frequency Shifting"—Journal of the Audio Engineering Society—vol. 10, No. 2—Apr. 1962.

*Primary Examiner* — Vivian Chin
*Assistant Examiner* — Friedrich W Fahnert
(74) *Attorney, Agent, or Firm* — Barbara R. Doutre; Daniel R. Bestor

(57) ABSTRACT

A method and apparatus for receiving and playing a signal in a radio receiver to suppress microphonic feedback are provided by alternately pitch shifting a received audio signal. The pitch of the received audio signal is alternately shifted up and then down, repeatedly over successive intervals of the audio signal, to produce a pitch swing signal which is then played over a speaker. The alternating pitch shifting prevents the buildup of regenerative feedback normally caused by acoustic vibrations coupling into the radio receiver.

19 Claims, 3 Drawing Sheets

METHOD AND APPARATUS FOR RECEIVING AND PLAYING A SIGNAL IN A RADIO RECEIVER

FIELD OF THE DISCLOSURE

The present disclosure relates generally to radio receivers and more particularly to suppressing microphonic feedback in such receivers.

BACKGROUND

In recent years, portable communication devices have become commonplace. These devices use a Radio Frequency (RF) transceiver to send and receive RF signals that typically include audio information. The RF transceiver includes a modulator and demodulator. The modulator modulates a carrier signal with a baseband signal for transmission, and demodulates received signals to obtain a transmitted baseband signal. Baseband signals can be decoded into an audio signal that is further processed and played by an audio circuit via a speaker so that the audio signal can be heard by a user of the device.

Many communication devices include a high-audio speaker to play the audio signal at higher volume levels, such as in a speakerphone application, or in a two-way handheld radio unit. A power amplifier is generally coupled to the speaker to amplify the signal sufficiently such that the user can adequately hear the output audio without having to hold the device to the user's ear, as is typical in a cellular phone. The high audio speaker is a transducer which converts electrical audio signals to mechanical movements of a transducer element to produce acoustic signals in the air.

The acoustic transducer creates significantly higher pressure levels compared to low level audio transducers, such as, for example, telephone earpiece speakers. Accordingly, a large amount of force is required to move the air at the diaphragm where the amount of force is a function of the size of the diaphragm and the size of the magnet. The forceful movement of the diaphragm at high audio levels can also push air into and out of the handset creating pressure which results in audio frequency vibrations in the handset device. Also, when the handset is not optimally enclosed or sealed, the internal acoustic pressure can couple acoustic vibrations into other portions of the device. The problem is noticeably worse when the speaker is in close proximity to the circuit board and electrical/electronic components of the device. All devices and components internal to the handset can be subject to these vibrations. These vibrations can induce bending of component boards such as those that house the RF modulation circuitry.

The electro-mechanical-acoustical stress and strain bending of the boards can change the electrical properties of the integrated circuits which can in turn alter the behavior properties of the device. For an RF component such as a Voltage Control Oscillator (VCO), the mechanical bending can vary the voltage, and, the VCO frequency deviates in relation to the vibration. The deviation effectively superimposes properties of the acoustic signal onto the demodulated signal. In effect, the vibration can modulate the behavior of the demodulator where the result can be regeneration of the output audio on top of the demodulated signal. This behavior is a feedback loop which can oscillate and be unstable when the signals become highly correlated, or in phase. In effect, the regenerative audio feedback acts as a parasitic modulation that gets demodulated and amplified over and over causing oscillatory feedback, commonly called 'microphonics'. The internal pressure is inversely proportional to the internal air volume. And, as devices become smaller the microphonics problem can continue to increase. Accordingly, a smaller device can go unstable at high volumes which causes a howling effect in the audio signal as a result of receiver audio regeneration.

Current approaches to avoid the bending of the circuit boards include material padding to absorb the sound, mechanical ribs or clips to limit the allowable degree of mechanical bending, and non-piezoelectric capacitors. The current approaches attempt to minimize the acoustic pressure build-up and/or isolate the acoustic coupling. They rely on mechanical solutions that cannot fully resolve the howling problem caused by the regenerative audio feedback. In addition, system engineers set a specification margin for certain parameters in shipping radios to account for tolerances in parts and variances in temperature. However, this lowers the overall volume gain of the handset. A final recourse, when the mechanical solutions are insufficiently capable of mitigating the howling behavior, is to lower the level of high audio speaker output by setting a maximum volume level corresponding to a gain specification level below which howling occurs. Accordingly, the device is shipped with a reduced loudness gain to meet the gain specification margin. However, this reduces the overall loudness level which users expect from a high audio speaker handset. In a public safety environment, or other high ambient noise condition, such restriction may not be acceptable.

Accordingly, there is a need for a method and apparatus for receiving and playing a signal in a radio receiver that avoids the problems associated with the prior art.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
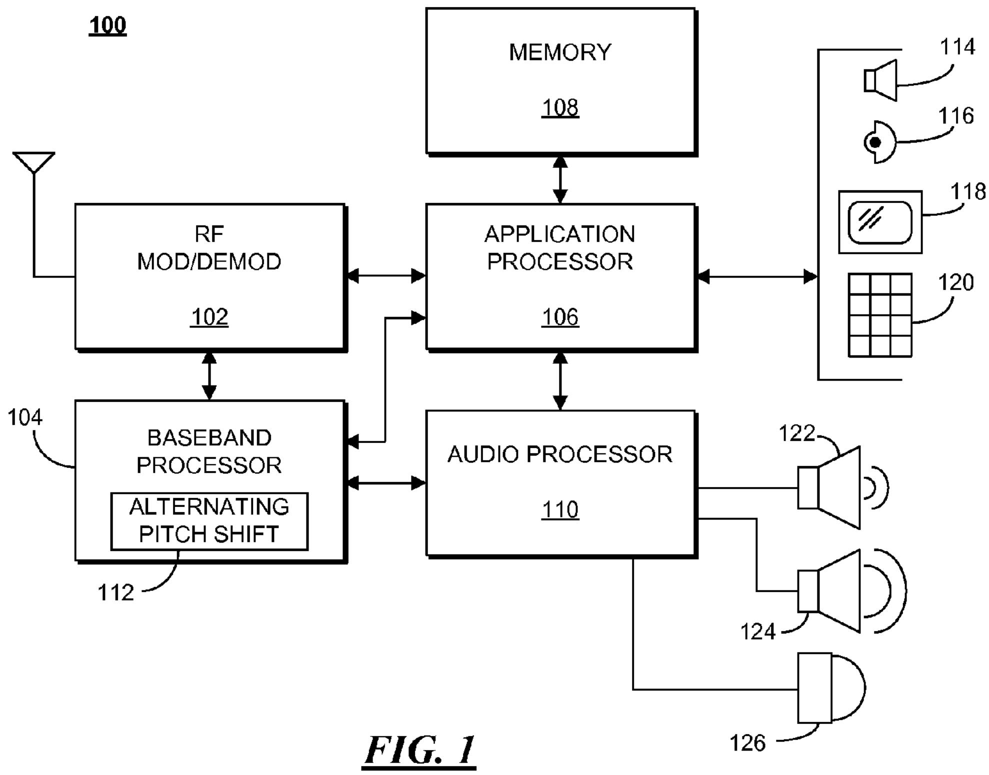
FIG. 1 is a block diagram of a communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments for solving the problems associated with the prior art include a method for suppressing microphonic feedback that commences by receiving a radio frequency signal, and demodulating the radio frequency signal to produce an audio signal having a nominal pitch. The method then applies an alternating pitch shift to the audio signal to repeatedly shift, in time, the original pitch between a positive pitch shift and a negative pitch shift to produce a pitch swing audio signal. The pitch swing audio signal is then played, converting the electrical representation of the signal into an acoustic signal via a speaker or other transducer.

FIG. 1 is a block diagram of a communication device 100 in accordance with some embodiments. The device illustrated here represents a general communication device. Specific communication devices can be designed with fewer and/or additional features than those shown here. The communication device is a radio communication device, and as such includes a radio frequency (RF) section 102 that can include antennas, amplifiers, filters, switches, frequency generation and control, as well as modulation and demodulation means. The RF section 102 receives baseband signals from a baseband processor 104, and transmits them at radio frequencies. Likewise, the RF section 102 receives RF signals and produces baseband or demodulated signals that are processed by the baseband processor 104. The baseband processor 104 includes an alternating pitch shifting function 112 which can shift the pitch of signal received from the RF section 102. The pitch shift operation is alternating, meaning for one interval the pitch is shifted up, and for a subsequent interval the pitch is shifted down. The alternating pitch shift is repeated continuously. The alternating pitch shifting operation prevents audio regeneration feedback in the receiver-audio loop due to microphonics.

The communication device 100 can further include a main or application processor 106, that, among other functions, control operation of the communication device 100 in accordance with programming instructions and user input. The application processor 106 is coupled to a memory 108, there here represents an aggregate memory including read only memory (ROM), random access memory (RAM) cache memory, and other types of memory that are conventionally employed in such devices. Furthermore, the baseband processor 104 can utilize elements of memory 108. Typically in a modern communication device instruction code that is executable by one or more processors, such as application processor 106 and baseband processor 104, is stored in memory 108, and while executing such instruction code, the processors use elements of memory 108 for "scratch pad" use, system variables, and so on. The communication device 100 can include user interface features to facilitate operation and control of the device. Typically such features can include an audio transducer 114 for producing audible alerts, such as beeps, ringing, and so on, to audibly inform a user that something is occurring. Sometimes a user may wish to operate the device in a "silent mode," so a vibration component 116 can be provided. Typically the vibration component includes an eccentric weight that is spun by an electric motor to produce vibrations. The communication device 100 further typically includes a graphical display 118 and a keypad 120 and other buttons. In some embodiments the graphical display 118 can be a touch screen that can display a virtual keypad and receive user input via the touch screen.

An audio processor 110 facilitates the reception and playing and acoustic signals. To play an audio signal the audio processor receives an audio signal from the baseband processor 104 in digital form. The audio processor converts the digital audio signal to an analog signal and applies amplification to the analog audio signal and applies the amplified audio analog signal to an audio transducer, such as a low audio transducer 122 or a high audio transducer 124. The low audio transducer 122 can be used for low audio volume signals, such as, for example, an earpiece speaker that is meant to be operated in close proximity to a user's ear. The high audio transducer 124 is meant for playing high volume audio signals that can be heard at a distance from the communication device 100, such as, for example, for speakerphone operation, or two way radio operation. In some embodiments the low audio transducer 122 and high audio transducer can be a single transducer that is simply operated at different audio levels, depending on the present mode of operation of the communication device 100. The high audio transducer 124, or its equivalent, is typically responsible for microphonics which causes regenerative audio feedback by causing vibrations in components of the RF section. The alternating pitch shift function 112, however, prevents such feedback from occurring.

The communication device uses a microphone 126 to receive acoustic signals, and produce a corresponding analog electrical signal which is provided to the audio processor 110. The audio processor 110 converts the received analog electrical audio signal into a digital signal. The digital audio signal is then forwarded to the baseband processor 104 to be converted into a baseband signal used by the RF section 102 to modulate a carrier.

Figure 2:
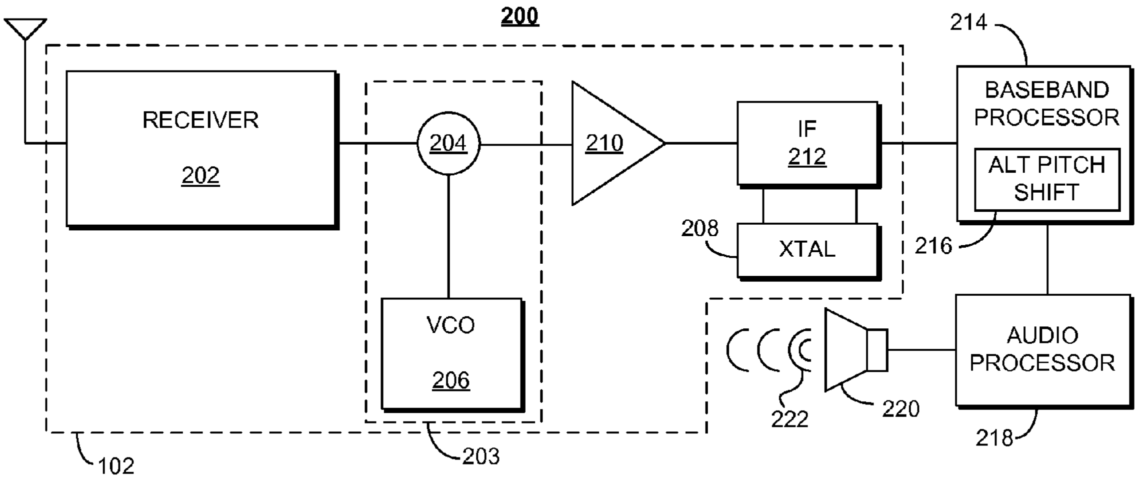
FIG. 2 is a block diagram of a feedback path in a communication device in accordance with some embodiments.

FIG. 2 is a block diagram of a feedback path 200 in a communication device in accordance with some embodiments. The feedback path 200 can be implemented in a communication device such as that exemplified in FIG. 1, and illustrates how the alternate pitch shifting reduces or eliminates audio regenerative feedback. In one arrangement, the RF section 102 can contain a receiver (RX) 202 that can receive a communication signal and a demodulator 203 that demodulates the received communication signal. In one arrangement, the demodulator 203 can include a mixer 204 and a Voltage Controlled Oscillator (VCO) 206 that together can demodulate the communication signal.

The RF section 102 can also include an Intermediate Frequency (IF) amplifier 210 and IF integrated circuit (IC) 212. The IF amplifier 210 can increase the signal fidelity (signal to noise ratio) to improve the demodulation at the secondary IF IC 212. As is known in the art, an IF stage 210-212 can utilize high quality crystals, such as crystal 208, and circuits to demodulate a high frequency signal down to base-band. It should also be noted that the particular embodiment of the IF stage 210-212 can be included or excluded without affecting the scope of the claimed embodiments of the invention. Accordingly, the demodulator 203 can demodulate the communication signal directly to an audio signal without going through an IF stage 210-212.

In one arrangement, a baseband processor 214 can include an alternating pitch shifter 216 that can alternately pitch shift an audio signal, meaning the polarity of pitch shift is continuously alternated between a positive pith shift and a negative pitch shift in successive intervals of time. The pitch shift either increases the pitch relative to the original audio signal for a positive pitch shift, or it decreases the pitch relative to the original audio signal for a negative pitch shift, depending on the present pitch shift polarity for a present interval. The resulting signal is a pitch swing signal where the pitch swings in time between a positive pitch shift and a negative pitch shift.

The baseband processor 214 can be substantially equivalent to baseband processor 104 of FIG. 1. The baseband processor 214 can be cooperatively connected to an audio processor 218 which can be cooperatively connected to a speaker 220. The audio processor 218 can be substantially equivalent to the audio processor 110 of FIG. 1. The alternating pitch shifter 216 can reside inside or outside the baseband processor 214 as an independent module. The operation of the alternating pitch shifter changes the pitch of the received audio signal by alternately shifting the pitch up, and then down, relative to its original pitch, in successive intervals or samples. The alternating action is repeated continuously while the alternating pitch shifter 216 is active. Furthermore, the alternating pitch shifter can vary the amount of shift applied to successive intervals or samples, or doublets of intervals or samples. The result is a pitch swing audio signal. The baseband processor 214 provides the pitch swing audio signal to the audio processor 218 so that the pitch swing audio signal can be played on speaker 229. That is, the pitch swing audio signal, as produced by the alternating pitch shifter 216, is in digital form. The audio processor converts the digital version of the pitch swing audio signal to an analog signal, and then amplifies it according to a volume control setting before it is applied to speaker 220. Notably, the high audio acoustic signal 222 generated by the speaker 220 can feed back into the RF section 102 internally through the housing or externally through the air, coupling vibrations into the circuit components. However, the action of the alternating pitch shifter prevents regenerative feedback, avoiding issues such as howling that are commonly experienced without mitigating the effects of microphonics.

Figure 3:
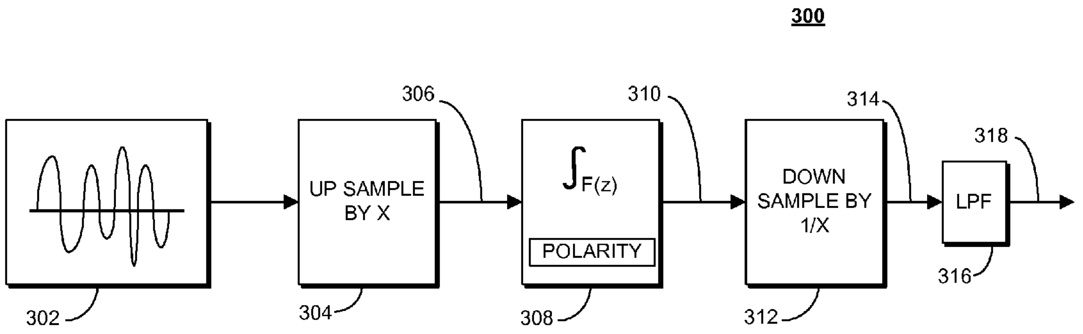
FIG. 3 is a block diagram of an alternating pitch shifting operation for a communication device in accordance with some embodiments.

FIG. 3 is a block diagram of an alternating pitch shifting operation 300 for a communication device in accordance with some embodiments. The operation is performed by an alternating pitch shifter such as 112 of FIG. 1 and 216 of FIG. 2, and commences by receiving an audio signal 302, such as that produced by processing a baseband signal produced by RF section 102. The audio signal 302 is in digital form, represented by a sequence of discrete values. The audio signal is first upsampled 304 by a prescribed factor. The upsampling increases the number of sample by the prescribed factor and can be performed, for example, by interpolating between the original samples. In some embodiments the upsampling is done by a factor of two, resulting in twice as many samples. The upsampling thereby produces an upsampled signal 306. The upsampled signal is pitch shifted by an alternating pitch shift operation 308 that alternates the pitch shift each interval or sample to produce a pitch swing signal 310. The pitch swing signal is then downsampled 312 by the inverse of the upsampling factor. That is, if the upsampling increases the number of samples by twice, the downsample halves the number of samples. The upsampling and down sampling operation addresses a noise problem caused by alternating the pitch of the audio signal without the upsampling and downsampling. The downsampled pitch swing signal 314 is then filtered by a low pass filter 316, such as a conventional 3 KHz low pass telephony filter. The result is an alternately pitch shifted signal referred to herein as a pitch swing signal 318.

Figure 4:
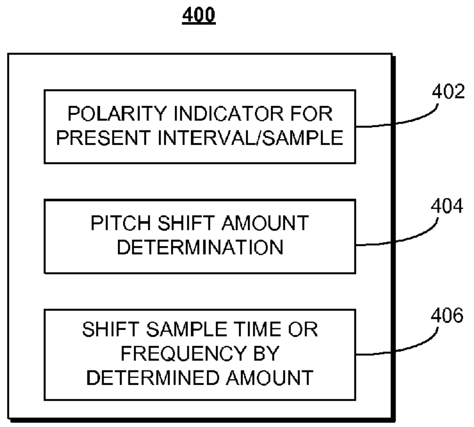
FIG. 4 is a functional block diagram of elements of an alternating pitch shifting processor in accordance with some embodiments.

FIG. 4 is a functional block diagram of elements of an alternating pitch shifting component or module 400 in accordance with some embodiments. The module 400 includes a polarity indicator 402 that can indicate the polarity, up or down, for shifting the pitch of the present sample or interval of the audio signal. The module can further include a pitch shift amount determination component 404 that is configured to determine how much to shift the pitch of the present sample or interval of the audio signal. The amount of pitch shift can be dependent of some parameter of the audio signal, such as amplitude, or other operations to be applied to the audio signal such as volume or amplification, or a combination of factors. For example, in some embodiments, the amount of pitch deviation from the original pitch can be proportional to the amplitude of the audio signal, so that as the amplitude increases, the amount of shift likewise increases. The amount of pitch shift can therefore be adjusted dynamically. Once the amount of shift and polarity is determined, the pitch shift is applied 406 to the present audio signal sample or interval being processed. Pitch can be shifted in either the time domain or the frequency domain. In the time domain the pitch can be shifted down by increasing the duration of a signal segment, i.e. stretching it out. Likewise, the pitch can be increased by reducing the duration of a signal segment. Therefore, pitch can be shifted by adjusting the position in time of a given sample.

Figure 5:
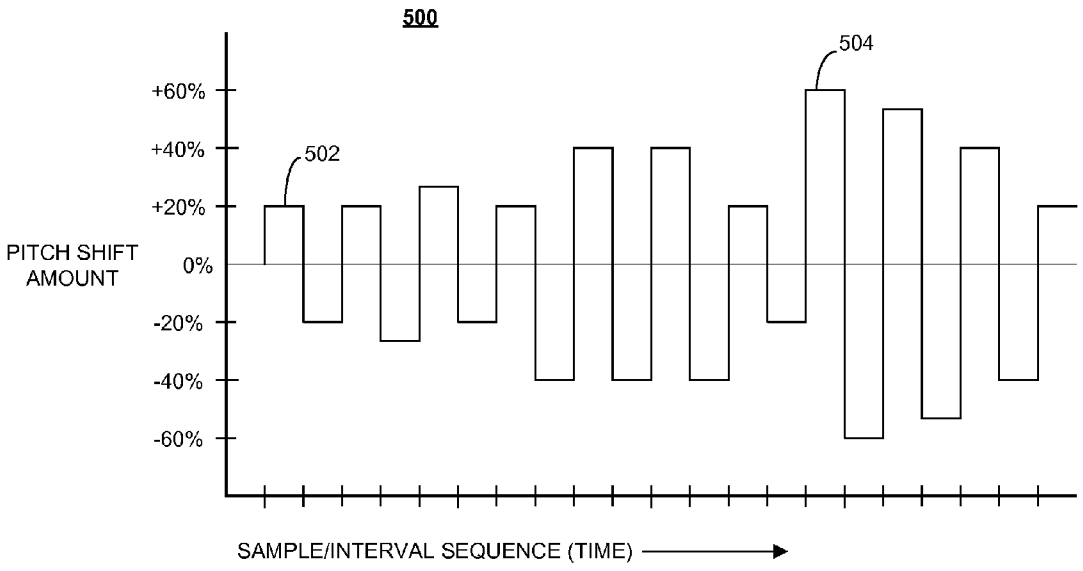
FIG. 5 is a graph chart of alternating pitch shift operation in accordance with some embodiments.

FIG. 5 is a graph chart of alternating pitch shift operation 500 in accordance with some embodiments. The graph chart shows pitch shift amount on the vertical axis as a percentage of shift from an original pitch (0%). The horizontal axis is in units of time, generally, but is partitioned into sample intervals for the present example. The graph shows how, at each successive sample interval, the pitch shift polarity alternates from a positive shift (shift up) to a negative shift (shift down) in the successive interval. And the alternating pattern is continuously repeated. In some embodiments the amount of pitch shift can vary between a minimum amount of shift 502 and a maximum amount of shift 504. For example, in some embodiments the minimum pitch shift can be 20% and the maximum shift can be 60%. In other embodiments the pattern of pitch shifting can be different than that shown. For example, in some embodiments the polarity of shift can be maintained over more than one interval before alternating. In other embodiments the pitch shift can be, for example, positive, then neutral (no shift), the negative, then neutral again, and then repeated. When the upshift and downshift percentages are added and averaged, the net pitch shift is substantially zero. When an interval is pitch shifted up by, for example, 50%, the next interval can be shifted down by 50% to maintain a zero average. Thus, in some embodiments, the amount of pitch shift applied can be on a per interval couplet (one up, then one down by the same percentage) basis to average out to zero. Other alternating pitch shift patterns may occur to those skilled in the art without departing from the scope of the present disclosure.

Figure 6:
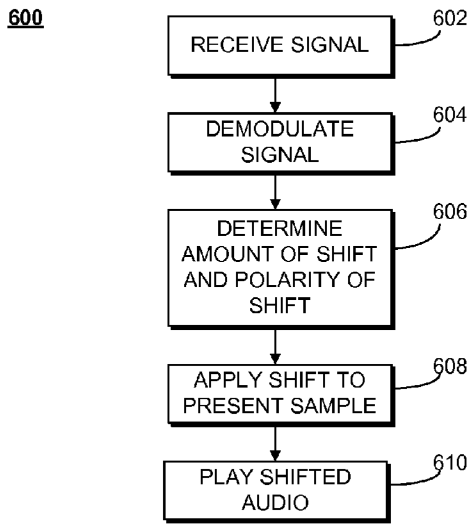
FIG. 6 is a flowchart of a method of alternately pitch shifting a received signal in accordance with some embodiments.

FIG. 6 is a flowchart of a method 600 of alternately pitch shifting a received signal in accordance with some embodiments. The method 600 commences by receiving 602 a RF signal containing or modulated by an audio signal. The RF signal is then demodulated 604 to produce a baseband signal that is processed to produce an audio signal. In some embodiments the method can include determining 606 an amount of pitch shift to be applied to a present interval or sample. The polarity (up or down) of the shift is also determined. The determined shift is then applied 608 to the present sample or interval of the audio signal to produce a pitch swing audio signal. The pitch swing audio signal is then played 610, such as over a high audio speaker.

The alternating pitch shifting described in the foregoing specification is beneficial to reduce microphonic in small or handheld radio devices that produce high audio. The alternating pitch shifting prevents regenerative feedback that would otherwise result from vibrations inside the device caused by the speaker used to play the high audio signal. By shifting the pitch alternately in successive intervals, the vibrational feedback that produced by the speaker is decoupled from presently received signal components being processed in the RF unit. Thus, there is no feedback related build up at any particular frequency.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms “comprises,” “comprising,” “has”, “having,” “includes”, “including,” “contains”, “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a”, “has . . . a”, “includes . . . a”, “contains . . . a” does not, without more constraints, preclude the existence of additional identical elements in the process, method, article, or apparatus that comprises, has, includes, contains the element. The terms “a” and “an” are defined as one or more unless explicitly stated otherwise herein. The terms “substantially”, “essentially”, “approximately”, “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “coupled” as used herein is defined as connected, although not necessarily directly and not necessarily mechanically. A device or structure that is “configured” in a certain way is configured in at least that way, but may also be configured in ways that are not listed.

It will be appreciated that some embodiments may be comprised of one or more generic or specialized processors (or “processing devices”) such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, non-transitory mediums such as a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for suppressing microphonic feedback, comprising:
- receiving a radio frequency signal;
- demodulating the radio frequency signal to produce an audio signal having a nominal pitch;
- applying an alternating pitch shift to the audio signal by alternatingly applying positive pitch shifts to first portions of the audio signal and negative pitch shifts to second portions of the audio signal to produce a pitch swing audio signal; and
- playing the pitch swing audio signal.

2. The method of claim 1, further comprising, after demodulating the radio frequency signal and prior to applying the alternating pitch shift, upsampling the audio signal; and
- after applying the alternating pitch shift and prior to playing the audio signal, downsampling the audio signal.

3. The method of claim 2, further comprising, after downsampling the audio signal and prior to playing the audio signal, applying a low pass filter to the audio signal.

4. The method of claim 2, wherein the upsampling is at a rate that is an inverse ratio to the downsampling rate.

5. The method of claim 1, wherein the audio signal is a digital signal comprised of digital samples, and for each pair of adjacent digital samples in the digital signal, a first digital sample in the pair comprises one of the first portions of the audio signal and the second portions of the audio signal, and a second digital sample in the pair comprises the other of the first portions of the audio signal and the second portions of the audio signal.

6. The method of claim 1, wherein applying the alternating pitch shift comprises shifting the pitch of the first portions by at least +20% and shifting the pitch of the second portions by at least −20%.

7. The method of claim 1, wherein the pitch shifting is alternated at regular intervals, the amount of pitch shifting is dependent on a magnitude of the audio signal during a present one of the regular intervals.

8. The method of claim 1, wherein the pitch shifting is alternated at regular intervals, the amount of pitch shifting is dependent on a volume setting for playing the audio of the audio signal during a present one of the regular intervals.

9. The method of claim 1, wherein a net pitch shift applied across the first and second portions of the audio signal is substantially zero.

10. A mobile communication device, comprising:

a radio frequency receiver configured to receive a radio frequency signal and demodulate the radio frequency signal to produce an audio signal;

a pitch-shifter coupled to the radio frequency receiver configured to apply an alternating pitch shift to the audio signal to repeatedly shift a nominal pitch of the audio signal by alternatingly applying a positive pitch shifts to first portions of the audio signal and negative pitch shifts to second portions of the audio signal to produce a pitch swing audio signal; and an audio circuit coupled to the pitch-shifter configured to play back the pitch swing audio signal over a speaker of the audio circuit.

11. The mobile communication device of claim 10, wherein the pitch-shifter, after demodulating the radio frequency signal and prior to applying the alternating pitch shift, upsamples the audio signal; and after applying the alternating pitch shift and prior to playing the audio signal, downsamples the audio signal.

12. The mobile communication device of claim 11, wherein the pitch-shifter upsamples by a factor that is an inverse ratio of the factor at which it downsamples.

13. The mobile communication device of claim 10, wherein the audio signal is a digital signal comprised of digital samples, and for each pair of adjacent digital samples in the digital signal, a first digital sample in the pair comprises one of the first portions of the audio signal and the second portions of the audio signal, and a second digital sample in the pair comprises the other of the first portions of the audio signal and the second portions of the audio signal.

14. The mobile communication device of claim 10, wherein the pitch-shifter alternately shifts the pitch of the first portions by at least +20% and shifts the pitch of the second portions by at least −20%, and limits the pitch shift of the first portions to not more than +60% and limits the pitch shift of the second portions to not more than −60%.

15. The mobile communication device of claim 10, wherein the pitch-shifter dynamically adjusts an amount of pitch shift based on at least one of a magnitude of the audio signal and a volume setting of the audio circuit.

16. The mobile communication device of claim 10, wherein a net pitch shift applied across the first and second portions of the audio signal is substantially zero.

17. A computer program product comprising computer readable instruction code stored on a non-transitory medium and which when executed by a processor causes the processor to:

receive a radio frequency signal;

demodulate the radio frequency signal to produce an audio signal that has a nominal pitch;

apply an alternating pitch shift to the audio signal by alternatingly applying positive pitch shifts to first portions of the audio signal and negative pitch shifts to second portions of the audio signal to produce a pitch swing audio signal; and playback the pitch swing audio signal.

18. The computer program product of claim 17, wherein the instruction code further comprises code to, after demodulating the radio frequency signal and prior to applying the alternating pitch shift, upsample the audio signal; and after applying the alternating pitch shift and prior to playing the audio signal, downsample the audio signal.

19. The computer program product of claim 17, wherein a net pitch shift applied across the first and second portions of the audio signal is substantially zero.

* * * * *